US00RE33828E

United States Patent [19]

Hashimoto et al.

[11] E Patent Number: Re. 33,828

[45] Reissued Date of Patent: Feb. 25, 1992

[54] FREEZING APPARATUS

[75] Inventors: Masahide Hashimoto; Yoshitaka Kurisu; Hiroshi Suenaga; Akio Katou, all of Nagasaki, Japan

[73] Assignee: Mitsubishi Denki Kabushiki Kaisha, Tokyo, Japan

[21] Appl. No.: 495,657

[22] Filed: Mar. 14, 1990

Related U.S. Patent Documents

Reissue of:

[64] Patent No.: 4,807,448
Issued: Feb. 28, 1989
Appl. No.: 168,383
Filed: Mar. 15, 1988

[30] Foreign Application Priority Data

| | | | |
|---|---|---|---|
| Mar. 18, 1987 | [JP] | Japan | 62-61151 |
| Mar. 18, 1987 | [JP] | Japan | 62-61152 |
| Mar. 18, 1987 | [JP] | Japan | 62-61153 |
| Mar. 18, 1987 | [JP] | Japan | 62-61154 |
| Mar. 18, 1987 | [JP] | Japan | 62-61155 |
| Mar. 18, 1987 | [JP] | Japan | 62-61156 |
| Mar. 18, 1987 | [JP] | Japan | 62-61160 |

[51] Int. Cl.[5] ..... F25D 17/02

[52] U.S. Cl. ..... 62/376; 62/381; 198/836.1

[58] Field of Search ..... 62/376, 381, 373, 374, 62/375, 63; 198/836

[56] References Cited

U.S. PATENT DOCUMENTS

| | | | |
|---|---|---|---|
| 1,827,629 | 10/1931 | Vogt | 62/341 |
| 2,726,658 | 12/1955 | Chessey | 128/400 |
| 3,316,734 | 5/1967 | Crane, Jr. | 62/381 |
| 4,534,183 | 8/1985 | Hashimoto et al. | 62/374 |
| 4,555,914 | 12/1985 | Kanato et al. | 62/376 |

FOREIGN PATENT DOCUMENTS

| | | |
|---|---|---|
| 2094728 | 2/1972 | France . |
| 59-60166 | 6/1984 | Japan . |

*Primary Examiner*—Ronald C. Capossela
*Attorney, Agent, or Firm*—Oblon, Spivak, McClelland, Maier & Neustadt

[57] ABSTRACT

A freezing apparatus comprises a cooling hollow body to receive food products to be frozen thereon and to be driven for rotation, a flexible container made of a flexible sheet material which is arranged on the upper surface of the cooling hollow body so as to cover said products placed on said upper surface, a cold brine circulating path including the hollow portion of the cooling hollow body and the interior of the flexible container which are mutually communicated to feed cold brine, a plurality of adapters attached to the outer periphery of the flexible container, and a guide rail provided around the outer periphery of the flexible container to slidably support the adapters. The flexible container is moved synchronously with the cooling hollow body due to a frictional force resulted between the flexible container and the cooling hollow body.

20 Claims, 20 Drawing Sheets

FREEZING APPARATUS

Matter enclosed in heavy brackets [ ] appears in the original patent but forms no part of this reissue specification; matter printed in italics indicates the additions made by reissue.

The present invention relates to a rotary type freezing apparatus capable of rapidly cooling or freezing in a continuous manner products such as food to be frozen from their entire surface.

FIG. 28 is a cross-sectional view of a conventional freezing apparatus disclosed in, for instance, Japanese Unexamined Patent Publication No. 60166/1984 and FIG. 29 is a cross-sectional view taken along a line A—A in FIG. 28.

In FIGS. 28 and 29, a reference numeral 1 designates a lower belt conveyor composed of a driving pulley 1a, a tension pulley 1b and an endless steel belt 1c wound around the pulleys 1a, 1b; a numeral 2 designates a brine tank placed underneath the upper portion of the endless steel belt 1c; a numeral 2a designates cold brine received in the brine tank 2; a numeral 3 designates an upper belt conveyor arranged above the lower belt conveyor 1. The upper belt conveyor is composed of a driving pulley 3a, a tension pulley 3b and a flexible endless belt 3c made of a flexible sheet material which is wound around the pulleys 3a, 3b. The flexible sheet belt 3c provides a cold brine receiving portion at the upper surface in its lower belt portion and cold brine 4 is supplied to the cold brine receiving portion. A numeral 5 designates products to be frozen such as food (hereinbelow, referred to as food products) which are to be sequentially supplied between the steel belt 1c and the flexible sheet belt 3c, and a numeral 6 designates a heat-insulating tunnel which provides a freezing zone 7 through which the food products 5 are linearly passed by means of the steel belt 1c and the flexible sheet belt 3c.

The operation of the conventional freezing apparatus will be described. The upper and lower belt conveyors 1, 3 are driven in a synchronous manner. The food products 5 are supplied between the steel belt 1c and the flexible sheet belt 3c from one end of the conveyors, and the food products 5 are linearly carried while they are interposed between the steel belt 1c and the flexible sheet belt 3c. During the carrying step, the lower surface of the food products 5 is directly cooled by the steel belt 1c which is previously cooled by the lower cold brine 2a, and the other surface of the food products 5 is directly cooled by the flexible sheet belt 3c which covers the upper portion of the products 5. The flexible sheet belt 3c is deformable in accordance with the shape of the food products 5 and cooled by the upper cold brine 4. Then, the food products are sequentially passed through the freezing zone 7 by means of the steel belt 1c and the flexible sheet belt 3c and finally, they are taken from the other end of the conveyors.

The conventional freeing apparatus have the following disadvantages. Namely, the belt conveyors 1, 3 do not allow the movement of the food products 5 other than the linear movement; a space for the driving pulleys and the tension pulleys occupies a relatively large in the freezing zone (when a small quantity of the food products is to be treated, a longer freezing zone is unnecessary), whereby it occupies a relatively large space for installation of the apparatus, and separate working areas are needed for supplying and taking-out of the food products.

It is an object of the present invention to provide a freezing apparatus capable of continuously cooling with good effeciency food products from their entire surface while the products are circularly transferred, and making the entire construction to be simple, light and compact.

The foregoing and the other objects of the present invention have been attained by providing a freezing apparatus which comprises;

a cooling hollow body adapted to receive thereon products to be frozen and adapted to be driven for rotation;

a flexible container made of a flexible sheet material which is arranged on the upper surface of the cooling hollow body so as to cover the products placed on the upper surface;

a cold brine circulating path including the hollow portion of the cooling hollow body and the interior of the flexible container which are mutually communicated to feed cold brine;

an adapter means comprising a plurality of adapters which are attached to the outer periphery of the flexible container; and a guide means provided around the outer periphery of the flexible container to slidably support the adapters, whereby the flexible container is moved synchronously with the cooling hollow body due to a frictional force resulted between the flexible container and the cooling hollow body.

Figure 1:
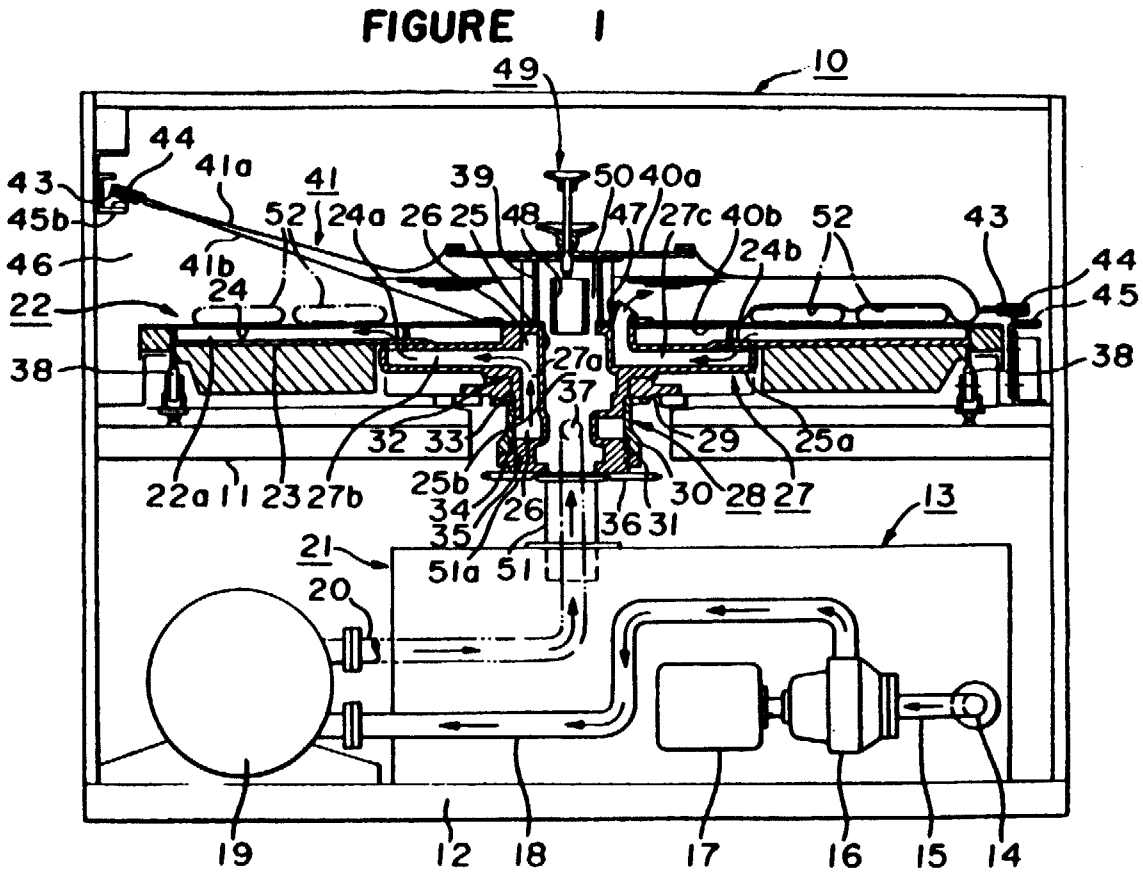
FIG. 1 is a longitudinal cross-sectional view of an embodiment of the freezing apparatus according to the present invention.
Figure 2:
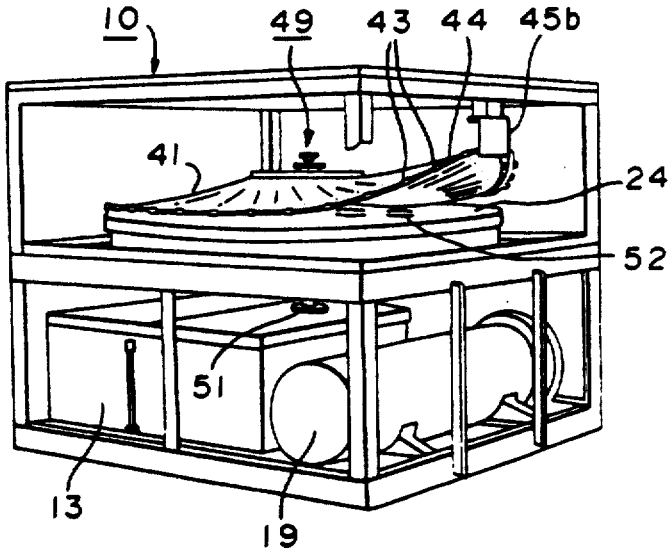
FIG. 2 is a perspective view of the freezing apparatus shown in FIG. 1.
Figure 3:
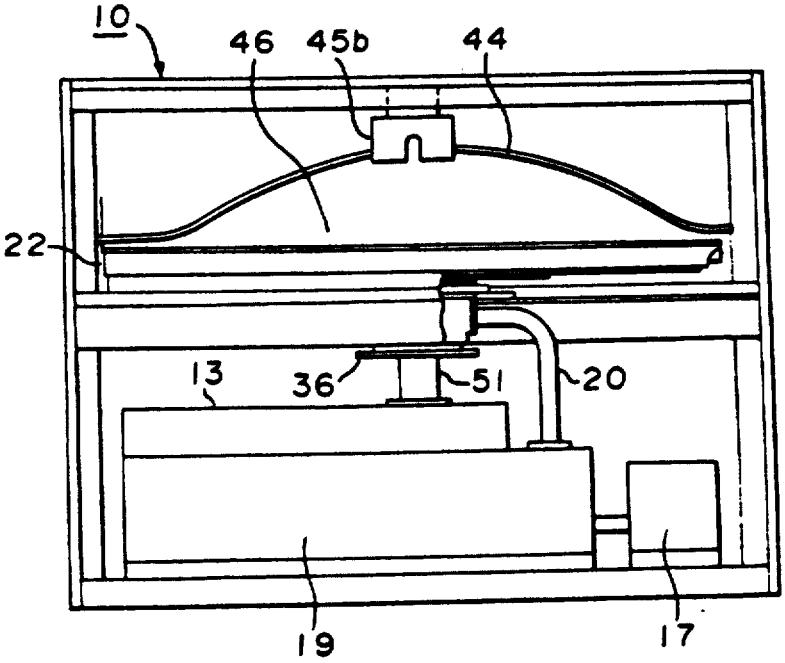
FIG. 3 is a front view partly broken of the freezing apparatus shown in FIG. 1.
Figure 4:
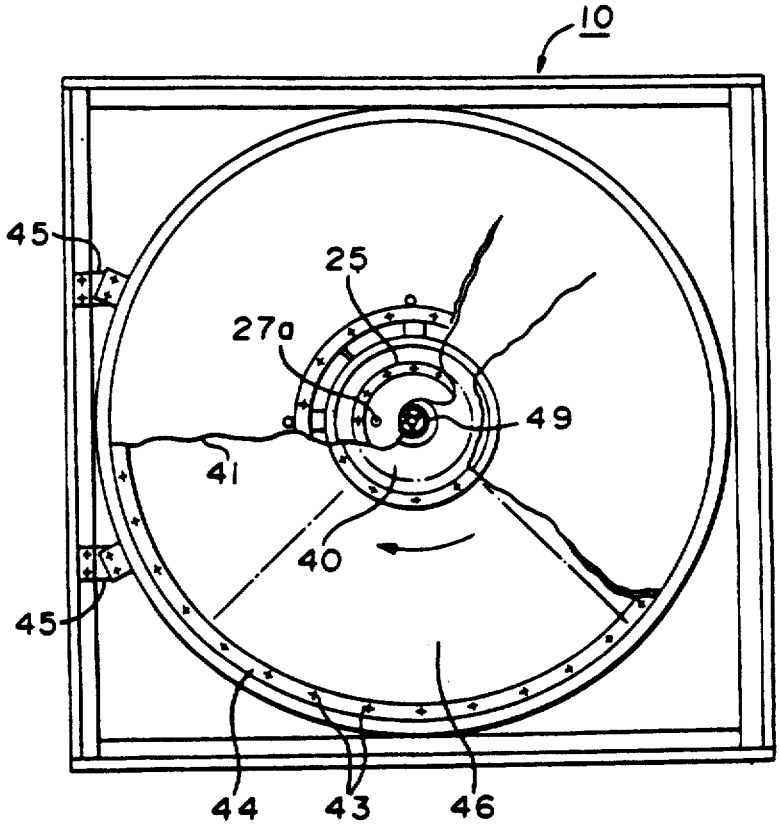
FIG. 4 is a plane view partly broken of the freezing apparatus shown in FIG. 1.

In the following, preferred embodiments of the present invention will be described with reference to the drawings.

In FIGS. 1–4 showing a first embodiment of the freezing apparatus according to the present invention, a reference numeral 10 designates a base for supporting the freezing apparatus of the present invention;

a numeral 11 designates a horizontal upper frame for separating the interior of the base 10 into upper and lower chambers, a numeral 12 designates a lower frame provided in the base, a numeral 13 designates a brine tank placed on the lower frame 12, a numeral 14 designates an outlet port formed in the brine tank 13, a numeral 16 designates a pump to which a brine pipe 15 is connected, a numeral 17 designates a motor for driving the pump 16, a numeral 18 designates a brine ejecting pipe whose one end is connected to the discharge side of the pump 16, a numeral 19 designates a brine cooling device having its suction side to which the other end of the brine ejecting pipe 18 is connected, and a numeral 20 designates a cold brine supplying pipe connected to the discharge side of the brine cooling device 19.

In this embodiment, the brine tank 13, the brine pipe 15, the pump 16, the motor 17, the brine ejecting pipe 18, the brine cooling device 19 and the cold brine supplying pipe 20 constitute a brine supplying means 21.

A cooling hollow body 22 comprises a flat-shaped rotatable brine vessel 23 with its top surface opened and a cooling plate 24 attached to the vessel 23 to close the upper open top of the rotatable brine vessel 23. A driving hollow rotary shaft 25 is fixed to the central portion of the cooling plate 24. A flange 25a is formed integrally with the upper part of the driving rotary shaft 25. A cold brine feeding path 26 in an annular form is formed at the outer periphery of the lower portion of the driving rotary shaft 25. A cold brine conduit 27 is formed in the driving rotary shaft 25. The conduit 27 comprises a vertical conduit 27a communicated with the cold brine feeding path 26 and extending in the axial direction of the shaft 25, a lateral conduit 27b communicated with the vertical conduit 27a and also communicated with an opening 24a as an introducing port formed in the cooling hollow body 22, and another lateral conduit 27c communicated with an opening 24b as a discharging port which is formed in the cooling hollow body 22 at a position opposing the opening 24a as the introducing port.

A bearing 28 is fixed to the upper frame 11 to support the driving rotary shaft 25 in a freely rotatable manner. In this embodiment, the bearing 28 comprises an upper bearing housing 29, an intermediate bearing housing 30 and a lower bearing housing 31 all of which are splittable in the axial direction. These bearing housings 29–31 can be assembled by means of bolts so that they are detachably connected with each other. The upper bearing housing 29 is fixed to the upper frame 11.

A numeral 32 designates a first sealing member for sealing the sliding surfaces between the lower part of the wall forming the lateral conduit 27b of the driving rotary shaft 25 and the upper bearing housing 29, a numeral 33 designates a second sealing member for sealing the intermediate bearing housing 30 to the lower bearing housing 31, and a numeral 35 designates third sealing members for sealing the lower bearing housing 31 to the driving rotary shaft 25. A reference numeral 36 designates a sprocket constituting a rotation-driving system which is detachably fitted to the lower part of the driving rotary shaft 25 by means of bolts, and it is driven by a driving means (not shown).

A cold brine inlet 37 is formed in the intermediate bearing housing 30, and the inlet 37 is connected to the cold brine supplying pipe 20 to feed cold brine into the cold brine feeding path 26.

A plurality of guide rollers are arranged in an annular form with a fixed intervals on the upper frame 11 so that the lower part of the outer periphery of the cooling hollow body 22 is rotatably supported. A plurality of supporting members 39 having a ]-shape in cross section are arranged with fixed intervals on the top of the driving rotary shaft 25. Circular sheet-fitting plates 40a, 40b are respectively attached to the upper ends and the lower ends of the supporting members 39. The supporting members 39 and the circular sheet-fitting plates 40a, 40b may be formed in one piece.

Figure 7:
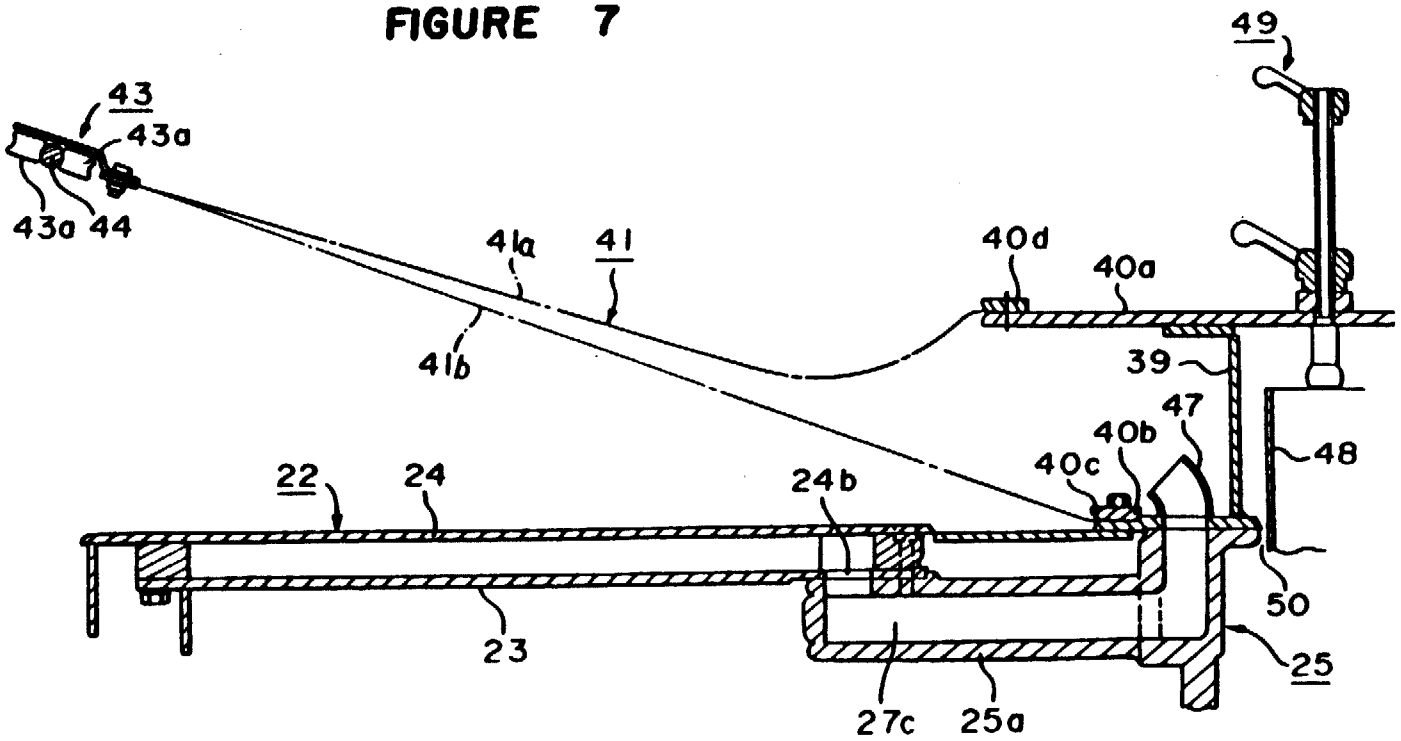
FIG. 7 is an enlarged cross-sectional view showing a flexible container and a fitting means used for the freezing apparatus of the present invention.
Figure 8:
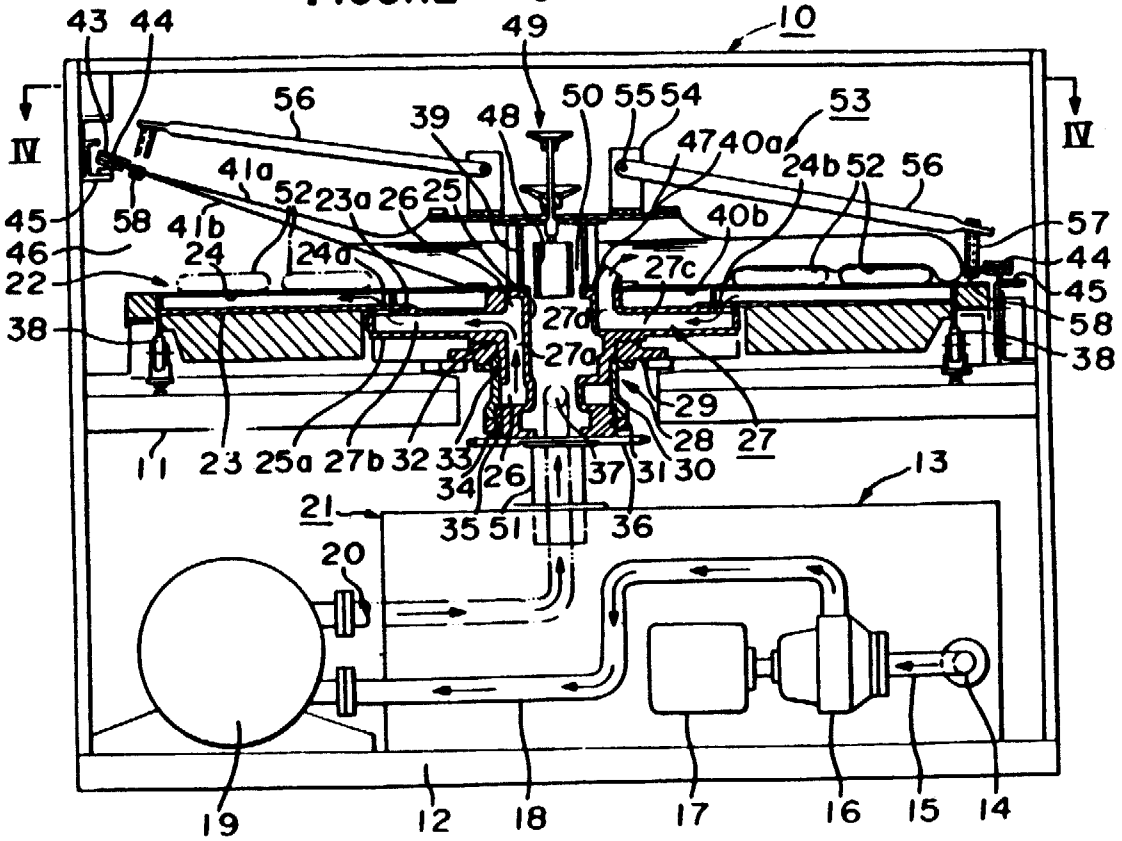
FIG. 8 is a longitudinal cross-sectional view of another embodiment of the freezing apparatus of the present invention.
Figure 9:
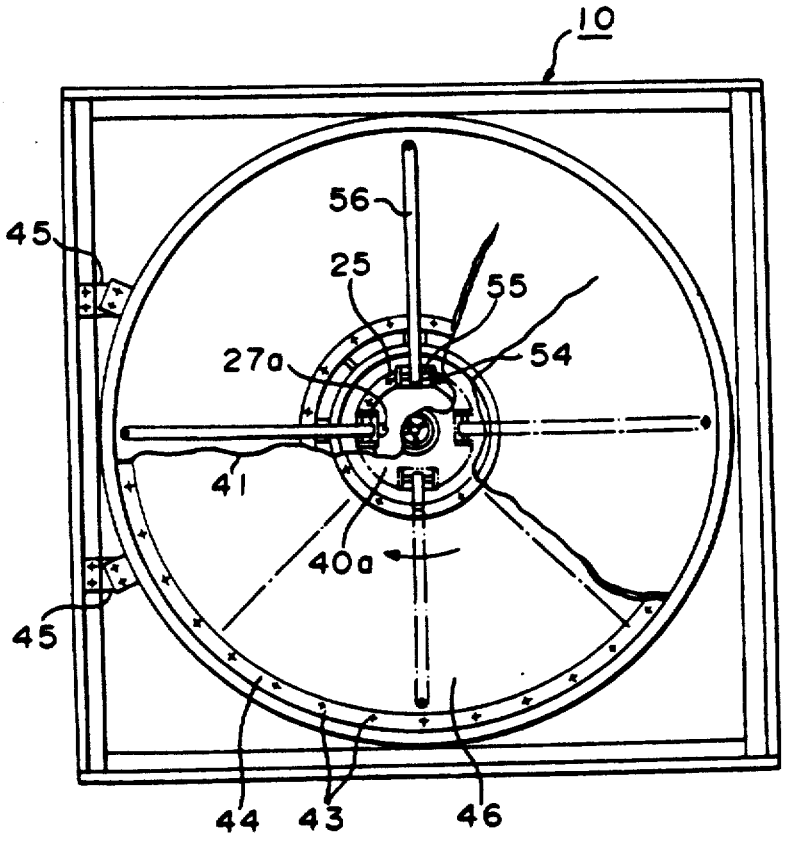
FIG. 9 is a plane view partly broken of the freezing apparatus shown in FIG. 8.

A reference numeral 41 designates a flexible container formed by a flexible sheet material which is arranged on and in contact with the cooling plate 24 of the cooling hollow body 22. The flexible container 41 may be formed by two sheet materials, i.e. the upper and lower sheet portions 41a, 41b, or may be formed by a annular tube. In the embodiment shown in FIG. 1, the inner circular edge of the upper sheet portion 41a is attached to the upper sheet-fitting plate 40a through a fitting piece 40d and the inner circular edge of the lower sheet portion 41b is attached to the lower sheet-fitting plate 40b through a fitting piece 40c in sealing condition respectively (FIG. 7). The outer circular edges of the upper and lower sheet portions are air-tightly joined together. A plurality of adapters 43 are fixed to the outer circular edge at a predetermined distance.

In the cooling hollow body 22, the inner diameter side of the rotatable brine vessel 23 is connected to the horizontally projecting flange 25a of the driving rotary shaft 25, and the lower fitting plate 40b is connected to the upper end surface of the driving rotary shaft 25. At the outer circumferential edge portion of the flexible container 41, a plurality of adapters comprising a deformable fitting frame in an annular form and a pair of rollers 43a held by the fitting frame at predetermined distances, are attached; preferably they are at an equal distance. An annular guide rail 44 is provided on the base 10 so as to movably support the adapters. A numeral 45 designates a plurality of supporting members for supporting the guide rail 44. At least one of the supporting members is provided at or near the inlet of the freezing apparatus 10, through which food products are supplied, is adapted to be moved vertically to raise the flexible guide rail 44 at a predetermined position. Namely, such supporting member functions as a lifter 45b.

A numeral 46 designates a food product supplying-/removing port formed between the cooling plate 24 and the flexible container 41, the port being obtained by lifting the flexible guide rail 44 by the lifter 45b. A cold brine supplying pipe 47 which communicates the lateral conduit 27c of the cold brine conduit 27 with the inside of the flexible container 41 is placed near the central portion of the sheet-fitting plate 40b. The cold brine supplying pipe 47 is preferably bent at an angle of 20°–45° so as to extend outwardly from the central portion of the flexible container 41.

An over-flow tube 48 is inserted in the upper opening part of the driving rotary shaft 25 to communicate the hollow portion of the shaft 25 with the inside of the flexible container 41. A liquid surface level adjusting means 49 is fitted to the upper sheet-fitting 40a to adjustably support the over-flow tube 48. In this embodiment, the adjusting means 49 comprises a handle and a screw rod which allow to ascend and descend the over-flow tube 48 by turning the handle.

A numeral 50 designates a cold brine passage formed between the outer circumferential surface of the lower part of over-flow tube 48 and the inner pheriphery of the sheet-fitting plate 40b, a numeral 51 designates a cold brine returning tube connected to the lower end of the driving rotary shaft 25 to communicate the hollow portion of the shaft 25 with the brine tank 13, and numerals 52 designate products such as food to be frozen (hereinbelow, referred to as food products) placed on the cooling plate 24.

The operation of the freezing apparatus according to the embodiment of the present invention will be described.

When the pump 16 is actuated, the cold brine in the brine tank 13 is sucked into the brine pipe 15. The cold brine is passed through the brine ejecting pipe 18 into the brine cooling device 19 where it is cooled, and then, the cold brine is supplied into the cold brine feeding path 26 through the cold brine supplying pipe 20 and the cold brine inlet 37. The cold brine in the feeding path 26 is supplied to the cooling hollow body 22 through the vertical conduit 27a and the lateral conduit 27b of the cold brine conduit 27 and the opening 24a. Also, the cold brine is supplied to the flexible container 41 through the opening 24b, the lateral conduit 27c and the cold brine supplying pipe 47. The cold brine in the flexible container 41 is maintained at a constant liquid level by means of the over-flow tube 48. Under the condition that the level of the cold brine is maintained by the over-flow tube 48, a part of the cold brine in the flexible container 41 flows in the hollow portion of the driving rotary shaft 45 through the cold brine passage 50. The cold brine falling through the passage 50 and a part of the cold brine flown in the over-flow tube 48 as over-flowing liquid are collected in the hollow portion of the shaft 25, whereby the collected cold brine is returned to the brine tank 13 through the brine returning tube 51. Thus, by circulating the cold brine from the brine tank 13 through the cooling hollow body 22 and the flexible container 41, the cooling plate 24 of the cooling hollow body 22 and the flexible container 41 are cooled.

Under the condition, when the cooling hollow body 22 is rotated, the flexible container 41 is subjected to a force to rotate it due to a frictional force caused between the cooling plate 24 and the lower portion of the container 41.

Since the rollers 43a are held in the adapters, which are fixed to the outer peripheral portion of the flexible container 41, so as to be able to roll on the guide rail 44, and a part of the outer peripheral portion of the flexible container can be lifted in compliance with the lifted portion of the guide rail 44, there is provided the food product supplying/removing port 46. When the food products 52 are placed on the cooling plate 24, they are transferred around the rotary shaft 25 on the cooling plate 24 in synchronism therewith. Then, they are wrapped by the flexible container 41 in contact with and on the cooling plate 24, whereby the lower portion of the food products 52 is cooled by the cooling plate 24 and the upper part and the side parts of the products 52 are cooled by the flexible container 41. During at least one turn of the cooling hollow body, the feed products are sufficiently frozen and they are taken out from the food product supplying/removing port 46.

Figure 5:
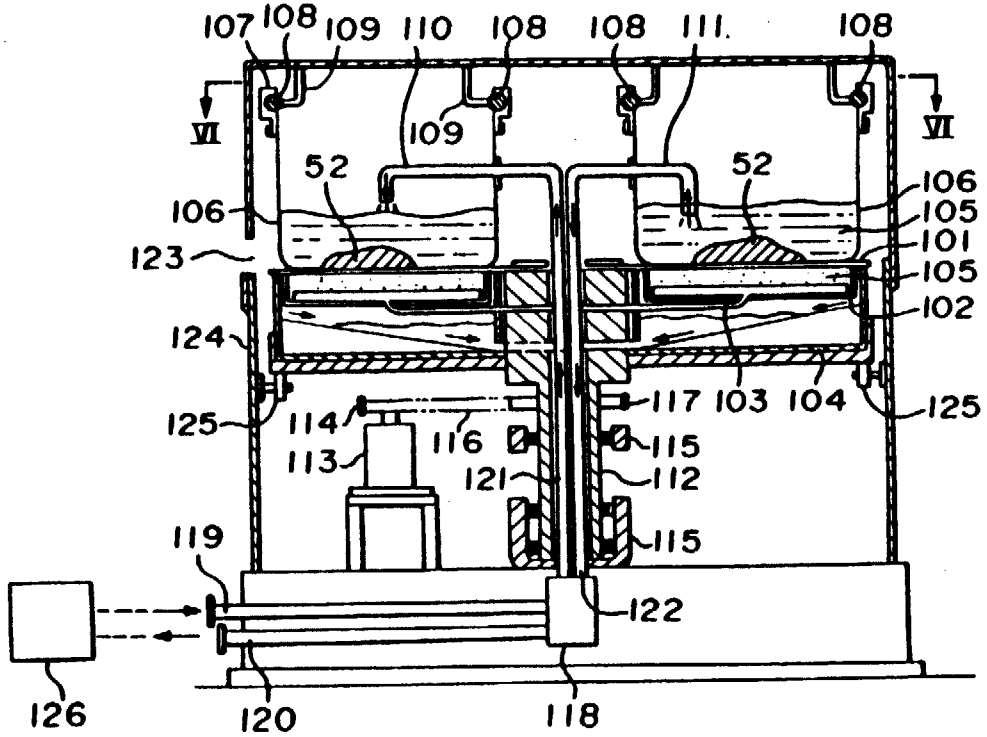
FIG. 5 is another embodiment of the freezing apparatus according to the present invention.
Figure 6:
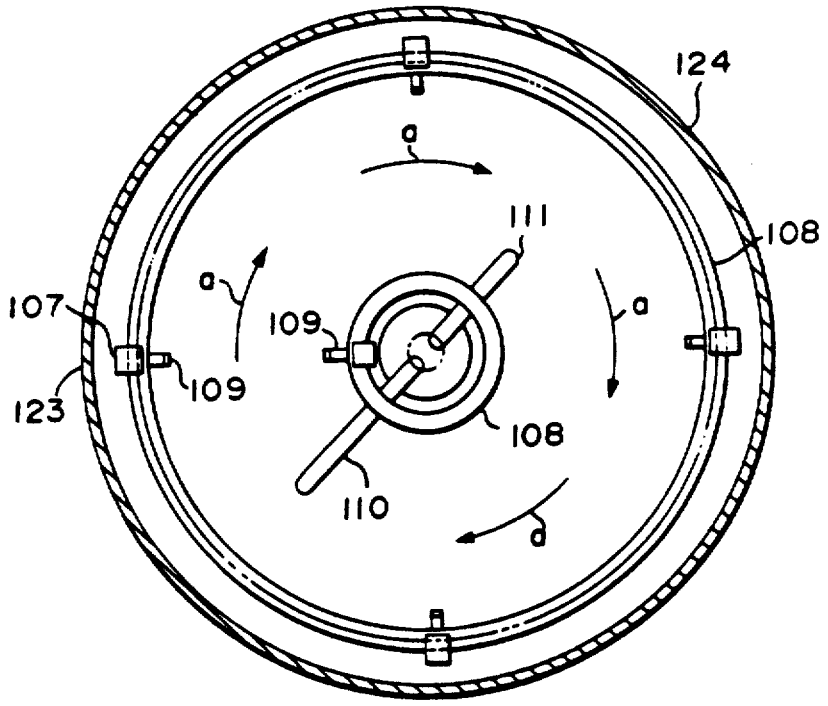
FIG. 6 is a cross-sectional view taken along a line VI—VI of the apparatus shown in FIG. 5.

FIGS. 5 and 6 show another embodiment of the present invention. In FIGS. 5 and 6, a reference numeral 101 designates a circular cooling plate extending horizontally, a numeral 102 designates a brine tank placed under the cooling plate 101 horizontally, a numeral 104 designates a brine receiver covering the outside and the lower portion of the brine tank 102, a numeral 103 designates a plurality of brine feeding tubes for introducing cold brine 105 as a cooling medium to the brine tank 102, and a numeral 106 designates a flexible container made of a flexible sheet material. The flexible container 106 is held in a U-shape by means of a guide frame and adapters, which are described in detail below, so that the lower surface of the flexible container 106 is in contact with the upper surface of the cooling plate 101 and the cold brine 105 as the cooling medium is supplied in the U-shaped flexible container 106.

The guide frame 108 having a double-ring structure as co-axially arranged guide rails which are disposed above the brine tank 102 horizontally. A plurality of adapters (in this embodiment, each twelve adapters are held by each of the guide rails) are attached to the inner and outer peripheries of the U-shaped flexible containers 106 at substantially equal distances. Thus, the adapters constitute a sheet holder.

A numeral 109 designates supporters each of which supports each of the guide rails 108 horizontally, a numeral 110 designates a brine introducing pipe for supplying the cold brine 105 in the flexible container 106, a numeral 111 designates a brine returning pipe for sucking the cold brine from the flexible container 106, a numeral 112 designates a hollow shaft supporting the cooling plate 101, the brine tank 102 and the brine receiver 104 so as to be in a co-axial state, a numeral 113 designates a motor for driving the hollow shaft 112, a numeral 114 designates a gear wheel attached to the driving shaft of the motor 113, a numeral 117 designates a gear wheel fixed to the shaft 112, and a numeral 116 designates a timing belt wound around the gear wheels 114, 117.

Numerals 115 designate bearings for rotatably supporting the hollow shaft 112 in the vertical direction, a numeral 121 designates a second brine introducing pipe passing through the hollow shaft 112, a numeral 122 designates a second brine returning pipe passing through the shaft 112, a numeral 119 designates a third brine introducing pipe connected to a heat exchanger 12b installed outside the freezing apparatus, a numeral 120 designates a third brine returning pipe connected to the heat exchanger 126, and a numeral 118 designates a rotary joint for connecting the second brine introducing pipe 121 to the third brine introducing pipe 119 and for connecting the second brine returning pipe 122 to the third brine returning pipe 120. The second brine introducing pipe 121 is connected to the first brine introducing pipe 110, and the second brine returning pipe 122 is connected to the first brine returning pipe 111. The brine feeding tubes 103 are connected to the intermediate portion of the second brine introducing pipe 121, and the lower end of the brine receiver 104 is connected to the intermediate portion of the second brine returning pipe 122.

A numeral 123 designates a food product supplying-/removing port, a numeral 124 designates a casing covering the entire part of the freezing apparatus and having the ceiling to which the supporters 109 for supporting the guide rails 108 are connected, and numerals 125 designate a number of rollers for supporting the bottom of the brine receiver 104.

Continuous freezing operation for the food products 52 effected by the embodiment of the freezing apparatus according to the present invention as shown in FIG. 5 will be described.

The cold brine 105 sufficiently cooled by the heat exchanger 126 is supplied to the brine tank 102 through the first to third brine introducing pipes 119, 121, 110, and on the other hand, it also supplied to the flexible container 106 through the second and third brine introducing pipes and brine feeding tubes 103.

During the supply of the cold brine 105 into the brine tank 102, an excessive amount of the cold brine 105 overflows from the gap formed between the upper edge of the outer periphery of the brine tank 102 and the cooling plate 101 to be recovered by the brine receiver 104. Then, the overflowed cold brine enters in the second brine returning pipe 122 to be fed to the heat exchanger 12b through the rotary joint 118 and the third brine returning pipe 120 by the action of a pump (not shown). Thus, the cold brine 105 is circulated between the brine tank 102 (the flexible container 106) and the heat exchanger 126, whereby the insides of the brine tank 102 and the flexible container 106 are maintained at a very low temperature. During the circulation of the cold brine to cool the cooling plate 101 and the flexible container 106, the motor 113 is actuated to rotate the driving shaft 112 through the gear wheels 114, 117 and the timing belt 116. The rotation of the shaft 112 causes the rotation of the cooling plate 101, the brine tank 102 and the brine receiver 104 which are integrally attached to the shaft 112 in the direction of the mark a in FIG. 6. The flexible container 106 held by the adapters 107 and the guide rails 108 are urged to the cooling plate 101 due to the weight of the cold brine 105. As a result, the flexible container 106 is also synchronously rotated in the direction as shown in FIG. 6 due to a frictional force between the cooling plate 101 and the lower surface of the flexible container 106. In this case, the second brine introducing pipe 121 and the second brine returning pipe 122 are rotated integrally with the shaft 112. However, the rotary joint 118 is interposed between the second pipes 121, 122 and the third brine introducing and returning pipes 119, 120, there is no trouble in circulating the cold brine 105 when the shaft 112 is rotated.

The food products 52 are sequentially put on the cooling plate 101 from the food product supplying-/removing port 103. Then, the food products 52 are sequentially wrapped by the flexible container 106 in association with the cooling plate 101 rotating in the direction of the arrow mark a, whereby they are rapidly cooled or frozen from their entire surfaces.

In the above-mentioned embodiments, the food products are brought into direct contact with the cooling means while they turns on the cooling plate in association with the flexible container rotating in synchronism with the cooling plate, whereby the food products are effectively cooled or frozen.

According to the freezing apparatus of the above-mentioned embodiments, the size of the apparatus can be compact in comparison with the conventional linear transferring type feeding apparatus and it requires a smaller space for installation. Further, in the freezing apparatus of the present invention, at least one guide rail is provided at the outer circumferential part of the flexible container, and adapters attached to the flexible container are supported by the guide rails in a slidable manner. Accordingly, the flexible container is rotated in synchronism with the cooling hollow body due to a frictional force resulted therebetween. This structure simplifys a supporting structure for the flexible container and reduces weight.

Further, in the freezing apparatus of the above-mentioned embodiments, a lifting means is provided to lift a pat of the guide rail along with the flexible container supported by the guide rail. Accordingly, an opening is formed between the flexible container and the cooling hollow body to allow putting on and removing from the food products from the opening. Since the flexible container can be moved by means of the slidable adapters and the guide rail, occurrence of wrinkles or twisting in the flexible container can be certainly avoided.

FIGS. 8 to 11 show another embodiment of the freezing apparatus according to the present invention. In FIGS. 8 to 11, the same reference numerals designate the same or corresponding parts, and therefore, description of these parts is omitted.

A reference numeral 53 designates an integration means to rotate the lower portion and the upper portion of the flexible container 41 together. The integration means 53 comprises four sets of bearings 54, each fixed on the upper surface of the upper sheet-fitting plate 40a, a lever 56 each one end being pivotally supported by a pin 55 in each of the bearings 54 so as to be singable in the vertical direction and a spacer 57 attached to the other end of the lever 56. The adapters 43 are attached to the outer periphery of the flexible container 41 which is attached to the free end of the spacers 57 by means of bolts 58.

The freezing apparatus of the embodiment shown in FIGS. 8 to 11 operates as follows.

When the cooling hollow body 22 is rotated, the flexible container 41 is also rotated in synchronism with the cooling hollow body 22 due to a frictional force caused between the lower sheet portion 41b of the flexible container 41 and the upper surface of the cooling plate 24. The upper sheet portion 41a of the flexible container 41 is rotated together with the lower sheet portion 41b by a rotating force supplied thereto through the levers 54 and the upper sheet-fitting plate 40a which is attached to the dividing shaft 25. In the embodiment of the freezing apparatus having the construction as above-mentioned, there is provided the integration means which causes the associated movement of the upper and lower sheet portions of the flexible container with the cooling hollow body, whereby occurrence of an excessive tension and an abnormal bending in the flexible container which may be caused by wrinkles or twisting in the container are avoidable, and therefore, the flexible container is durable for a long term use.

Figure 10:
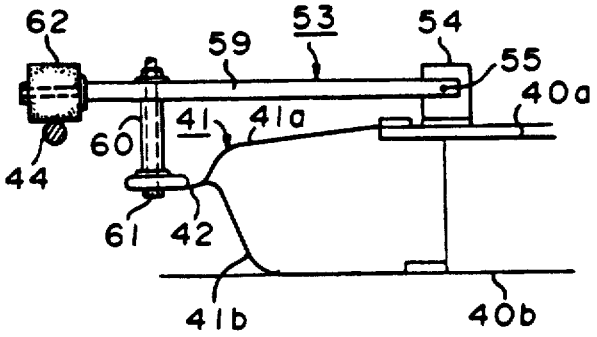
FIG. 10 is a side view showing an embodiment of an integration means for the upper and lower portions of the flexible container according to the present invention.

FIG. 10 is a diagram showing a modification of the integration means 53. In FIG. 10, the same reference numerals as in FIGS. 8 and 9 designate the same or corresponding parts. A lever 59 is supported at its one end by each of the bearings 54 so as to be singable in the vertical direction. A spacer 60 is fitted to the intermediate part of the lever 59. To the free end of the spacer 60, a roller fitting part of the outer circumferential part of the flexible container 41 is attached with a bolt 61. An adapter 62 is secured to the free end of each of the levers 59 so as to roll on and along the guide rail 44.

In the modified embodiment of the integration means 53, when the driving shaft 25 is rotated, the flexible container 41 is rotated in synchronism with the cooling plate 24 due to the frictional force resulted between the lower sheet portion 41b of the container 21 and the cooling plate 24, and at the same time, the upper sheet portion 41a is forced to rotate together with the lower sheet portion 41b by a force applied by the lever 59.

In this case, the adapters 62 provided at the free end of the levers 59 move on the guide rail 44. In particular, at the portion of the guide rail 44 lifted, the outer circumferential portion of the flexible container 41 can be smoothly separated and lifted from the cooling plate 24.

Figure 11:
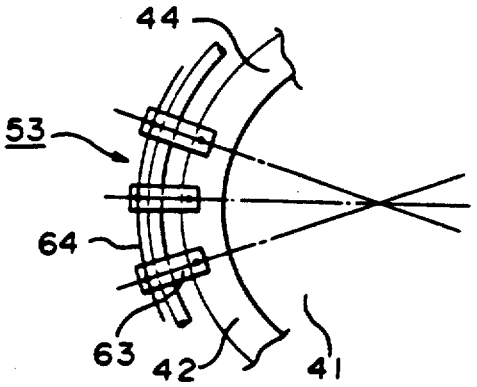
FIG. 11 is a plane view partly broken of the integration means.

FIG. 11 shows a further embodiment of the integration means 53. In this embodiment, a plurality of supporting members 63 are provided at the outer periphery of a roller fitting 42 which is in turn attached to the outer periphery of the flexible container 41. A flexible wire 64 connects the free end of each of the supporting members 63. Accordingly, when the flexible container 41 rotates in synchronism with the cooling plate 24 due to the frictional force between the lower sheet portion 41b and the cooling plate 24, the wire 64 restricts the deformation of the roller fitting 63 itself and change in the distance between the supporting members 63. Accordingly, the upper sheet portion 41a of the flexible container 41 rotates along with the lower sheet portion 41b. As a result, occurrence of wrinkles and twisting in the flexible container can be minimized. In this embodiment, there is an advantage that a thin flexible sheet can be used for the flexible container to provide a large effect of cooling, in addition to the advantages described with reference to the embodiments shown in FIGS. 8 to 10.

Figure 12:
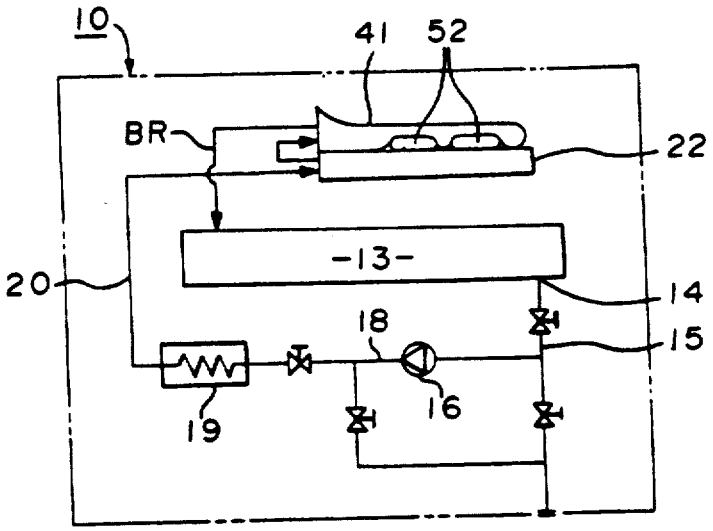
FIG. 12 is a diagram of an embodiment of a cold brine circulating circuit for the freezing apparatus of the present invention.

FIG. 12 shows still another embodiment of the freezing apparatus according to the present invention.

The embodiment shown in FIG. 12 is in particular to prevent frosting and icing of the surface of the cooling hollow body and the flexible container owing to the cold brine remaining the inside of them when the freezing apparatus is not in use.

In this embodiment of the present invention, a brine tank and a cold brine supplying means are provided below a cooling hollow body on which a flexible container is placed in contact with the upper surface of the cooling hollow body, and a cold brine discharging conduit is formed in communication with the cooling hollow body and the interior of the flexible container, the conduit being adapted to feed the cold brine into the brine tank.

With reference to FIGS. 1 and 12 in which the same reference numerals designate the same or corresponding parts, cold brine returning tube 51 is provided at the lower end of the driving shaft 25 to communicate the hollow portion of the shaft 25 with the brine tank 13. A cold brine discharging conduit BR is constituted by the cold brine returning tube 51, a cold brine discharging port 25b and the cold brine passage 50 formed between the circumferential surface of the over-flow tube and the inner periphery of the lower sheet-fitting plate 40b so that the cold brine in the flexible container flows into the brine tank.

When the freezing apparatus is stopped its operation, the cold brine in the flexible container 41 naturally falls through the cold brine discharging conduit BR, i.e. the cold brine discharging port 50, the cold brine discharging port 25b and brine returning tube 51 to be recovered in the brine tank 13.

On the other hand, the cold brine remaining in the cooling hollow body 22 naturally falls into the brine tank 13 through the cold brine introducing port 24a, the lateral conduit 27b and the vertical conduit 27a of the cold brine conduit 27, the cold brine feeding path 26, the cold brine inlet 37, the supplying tube 20, the cooling device 19, the ejecting pipe 18, the pump 16, the suction pipe 15 and the outlet 14. Accordingly, the icing and frosting of the cooling hollow body and flexible container owing to the remaining cold brine can be certainly prevented, whereby possible breakage of the flexible container and delay in the operation of the cooling hollow body which may cause when it is restarted can be prevented.

Figure 13:
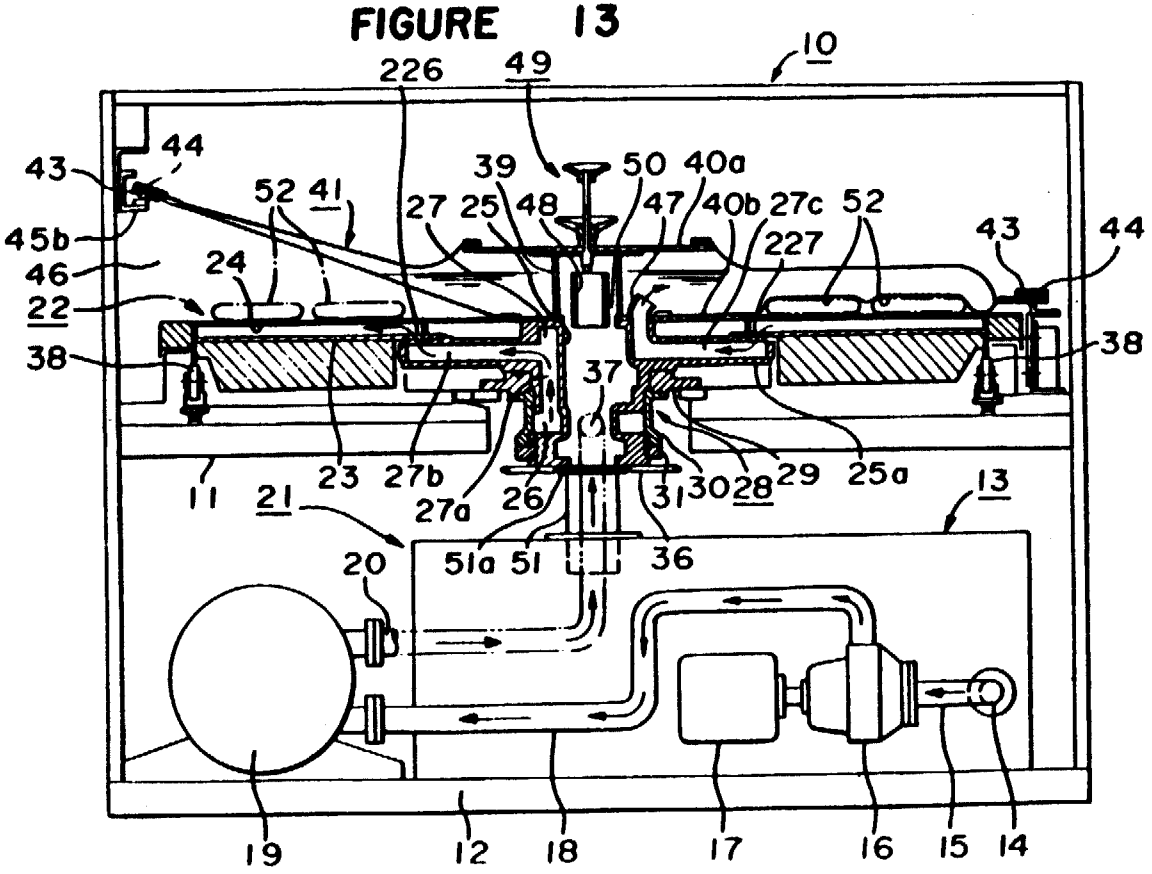
FIG. 13 is a longitudinal cross-sectional view showing another embodiment of the freezing apparatus according to the present invention.
Figure 14:
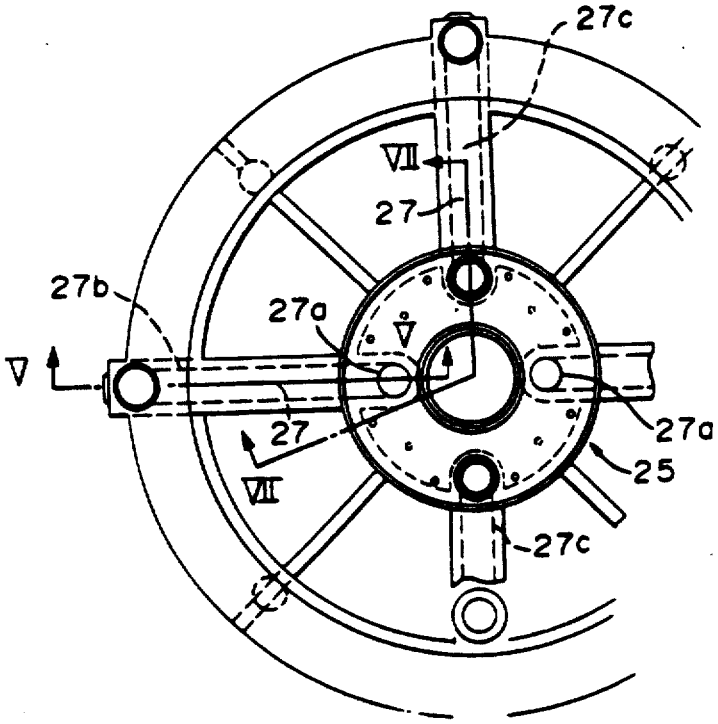
FIG. 14 is a plane view partly broken of an embodiment of the a cooling hollow body for the freezing apparatus of the present invention.
Figure 15:
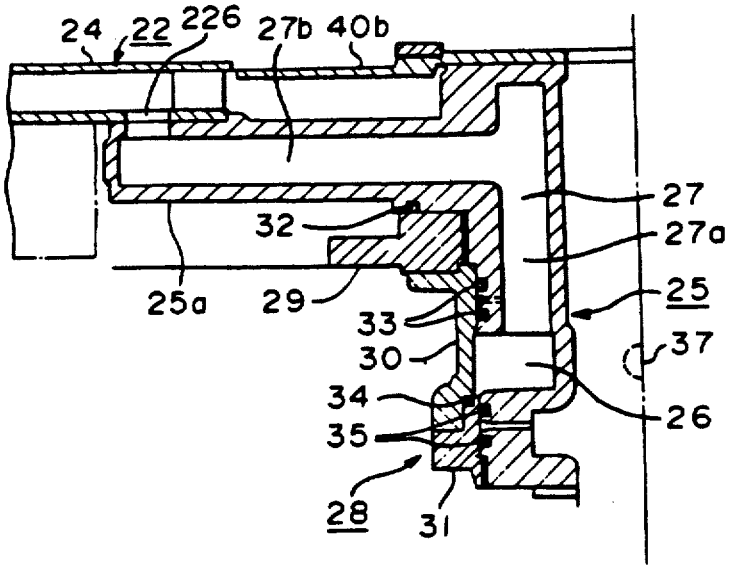
FIG. 15 is a cross-sectional view taken along a line V—V in FIG. 14.
Figure 16:
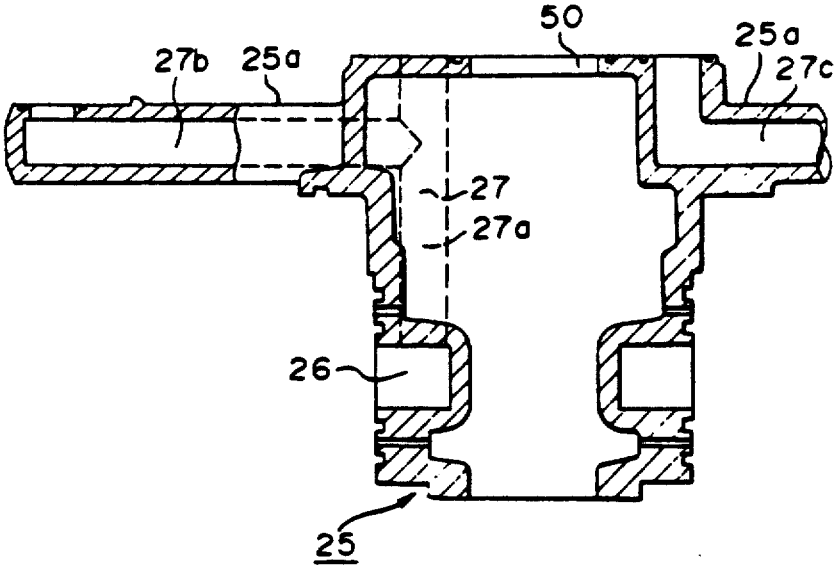
FIG. 16 is a cross-sectional view taken along a line VII—VII in FIG. 14.
Figure 17:
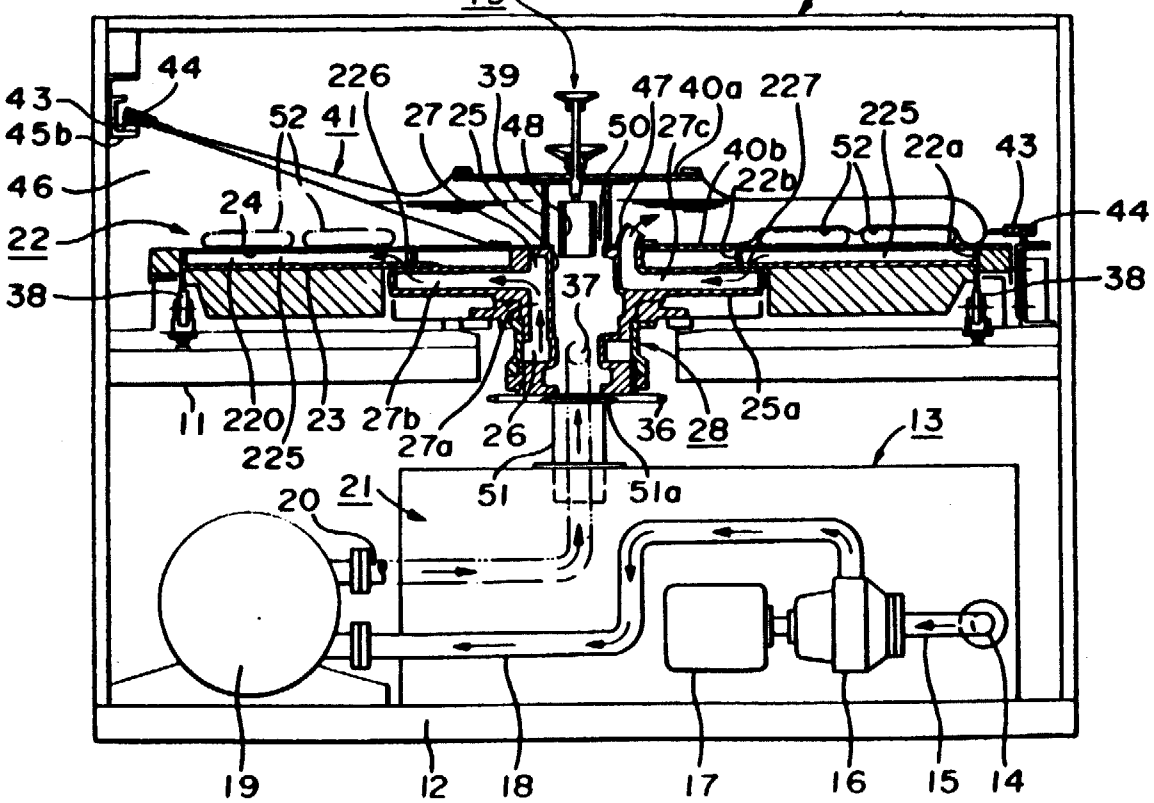
FIG. 17 is a longitudinal cross-sectional view of another embodiment of the freezing apparatus according to the present invention.

FIGS. 13 and 14 show a separate embodiment of the freezing apparatus according to the present invention. In FIGS. 13, 14, the same reference numerals as in FIG. 1 designate the same or corresponding parts, and therefore, description of these parts is omitted.

A reference numeral 226 designates a plurality of cold brine introducing ports formed at the inner diameter side of the bottom of the brine tank 23, and a numeral 227 designates a plurality of cold brine discharging ports formed at the inner diameter side of the bottom of the brine tank 23, the position of each of the discharging ports being in point symmetry with each of the introducing ports 226.

The cold brine conduit 27 is formed by the vertical conduit 27a communicated with the cold brine feeding path 26 to extend in the axial direction of the driving shaft 25, the lateral conduit 27b formed in the horizontally projecting flange 25a to communicate the vertical conduit 27a with the cooling hollow body 22 through the cold brine introducing port 226, and the lateral conduit 27c provided opposing the lateral conduit 27b communicating with the cooling hollow body 22 through the cold brine discharging port 227.

The bearing 28 fixed to the upper frame 11 to rotatably support the driving shaft 25 comprises the upper bearing housing 29, the intermediate bearing housing 30 and the lower bearing housing 31 whcih are disconnectable in the axial direction.

The bearing housings 29–31 are detachably assembled in the same axial direction by means of bolts. The upper bearing housing 29 is fixed to the upper frame 11. Reference numerals 32, 33, 34 and 35 respectively designate sealing members which are the same as that described with reference to FIG. 1. The driving shaft 25 is driven by the sprocket 36 detachably fitted to the lower end of it by means of bolts, and the sprocket 36 is driven by a driving means (not shown). A cold brine introducing port 37 is formed in the intermediate bearing housing 30 to feed the cold brine into the cold brine feeding path 26 through the cold brine supplying tube 20.

In the following, explanation will be made as to how the bearing housings are disassembled for inspection and replacement of the sealing members.

First of all, the cold brine returning tube 51 attached to the lower end of the driving shaft 25 is removed downwardly by releasing a fastening means which fixes the cold brine returning tube 51 to the flange 51a and the driving shaft 25. In this case, the tube 51 falls toward the brine tank 13. However, there is no possibility that the tube 51 becomes in contact with the brine stored in the brine tank because the flange 51 come to contact with the upper part of the brine tank 13. Then, the sprocket 36 is removed from the driving shaft 25. Thus, inspection of the hollow portion of the driving shaft 25 is allowed, and removal of the lower bearing housing 31 is also allowed. Then, the lower bearing housing 31 is disconnected from the intermediate bearing housing 30. Thus, by lowering the lower bearing housing 31, it is possible to conduct inspection and replacement of the sealing members 34, 35. In the same manner as described above, the intermediate housing 30 is disconnected from the upper bearing housing 29. By lowering the intermediate bearing housing for removal, it is possible to conduct inspection and replacement of the sealing member 33. Since the inspection and replacement of the sealing members 33–35 can be performed by merely lowering the sprocket 36, the lower and intermediate housings 31, 30, such inspection and replacement can be easily carried out even though the space formed between the lower end of the driving shaft 25 and the upper surface of the brine tank 13 is small.

FIGS. 17 to 21 show another embodiment of the present invention. In FIGS. 17 to 21, the same reference numerals as in FIGS. 1, 8 and 13 designate the same or corresponding parts, and therefore, description of these parts is omitted.

A reference numeral 220 designates a plurality of separating plates for defining the inside of the cooling hollow body 22 into a plurality of sections. In the embodiment shown in the figures, the interior of the cooling hollow body 22 is divided into four sections.

Numerals 221 and 222 designate first and second flow-regulating plates which are radially, alternately arranged in the cooling hollow body 21 with a predetermined distances. The first flow-regulating plates 221 which are inwardly deflected are connected to the outer circumferential wall portion 22a of the cooling hollow body 22, and the second flow-regulating plates 222 which are outwardly deflected are connected to the inner circumferential wall poriton 22b of the cooling hollow body 22. In the embodiment shown in FIG. 18, arrangement of the first and second flow-regulating plates 221, 222 in the cooling hollow body 22 is such that the second flow-regulating plates 222 are provided at both sides of each of the separating plates 220 and each of the first flow-regulating plates 221 is between the second flow-regulating plates 222. An inner communicating portion 223 is formed between the inner circumferential wall portion 22b and the innermost end of each of the first flow-regulating plates 221. An outer communicating portion 224 is formed between the outer circumferential wall portion 22a and the outermost end of each of the second flow-regulating plates 222. Thus, a zig-zag flow path 225 is defined by the separating plates 220 and the first and second flow-regulating plates 221, 222. A plurality of cold brine introducing ports 226 and cold brine discharging ports 227 are formed near the inner circumferential wall portion 22b and at both sides of each of the separating plates 220. By-pass passages 228 are formed in the first flow-regulating plates 221 at positions near the joining portion between the outer circumferential wall portion 22a and the first flow-regulating plates 221.

Figure 19:
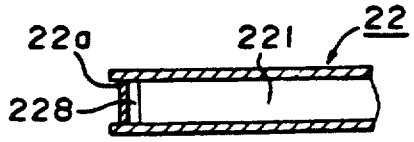
FIGS. 19–21 are respectively enlarged cross-sectional view showing a portion A in FIG. 18 in detail respectively.
Figure 20:
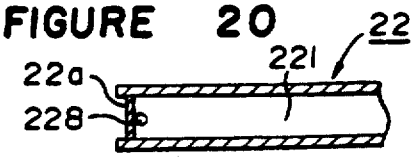
Figure 21:
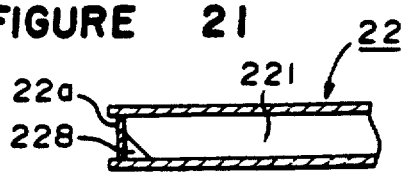

The by-pass passages 228 may be in a form of air gap formed between the outer circumferential wall portion 22a and the first flow-regulating plates 221 as shown in FIG. 19; or they may be a circular through holes formed at the outer end of each of the first flow-regulating plates 221 as shown in FIG. 20; or they may be cut portions formed at the lower side at the outer end portion of each of the first flow-regulating plates as shown in FIG. 21.

The operation of the embodiment shown in FIGS. 17 to 21 will be described.

The cold brine supplied to the cold brine feeding path 26 is supplied to the cooling hollow body 22 through the vertical conduit 27a and the lateral conduit 27b of the cold brine conduit 27 via the cod brine introducing port 226. The cold brine in the cooling hollow body 22 flows along the cold brine zig-zag flow path 225 and at the same time, a part of the cold brine passes through the by-pass passages 228 in the direction of the flow of the cold brine. Accordingly, there is no possibility of stay of the cold brine at the corner portions formed by the outer circumferential wall portion 22a and the outermost part of the first flow-regulating plates 221 and the cold brine flows in the zig-zag flow path 225 at a relatively large flow rate and flows to the lateral conduit 27c through the cold brine discharging port 227; thus, a substantially uniform cold heat radiation is effected to the upper surface of the cooling plate. The cold brine in the lateral conduit 27 is then fed to the flexible container 41 through the cold brine supplying tube 47.

Figure 18:
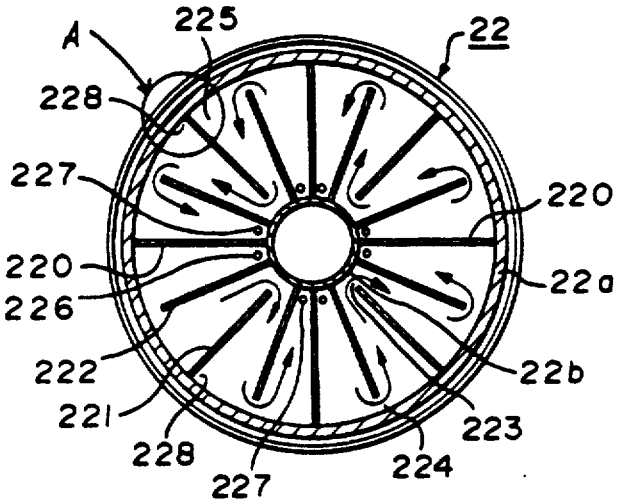
FIG. 18 is a transverse cross-sectional view of an embodiment of the cooling hollow body of the present invention.
Figure 22:
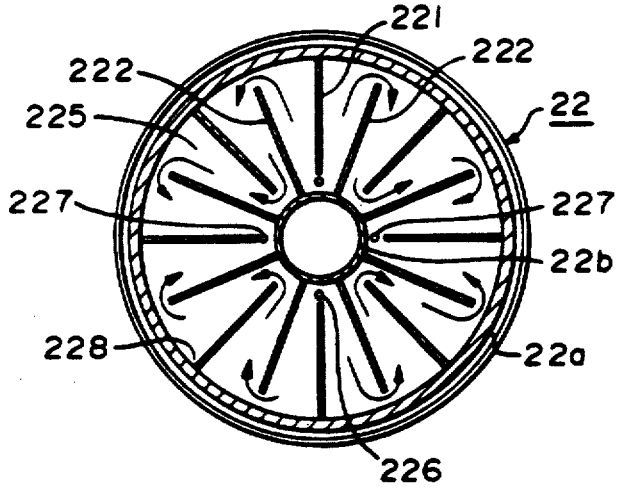
FIG. 22 is a transverse cross-sectional view of another embodiment of the cooling hollow body of the present invention.

FIG. 22 shows another embodiment of the cooling hollow body 22. In this embodiment, the separating plates 220 as in FIG. 18 are omitted, and a cold-brine zig-zag flow path 225 is formed by arranging the first and second flow-regulating paltes alternately in the cooling hollow body 22. A plurality of cold brine introducing ports 226 and cold brine discharging ports 227 are formed in the cooling hollow body 22 at positions near the innermost end of the first flow-regulating plates 221 and on the line connecting the axial center of the cooling hollow body 22 to the extension of the first flow-regulating plates 221. Accordingly, the cold brine introduced through the cold brine introducing ports 226 is divided in a substantially uniform fashion at both sides of each of the first flow-regulating plates 221 in the vicinity of the cold brine introducing ports 226, and each of the divided streams of flow is forwarded to the cold brine discharging ports 227. In this embodiment, the same effect of uniform cold heat transmission to the cooling plate can be effected in the same manner as the embodiment shown in FIG. 18. Accordingly, the food products placed on the cooling hollow body 22 can be uniformly cooled.

FIGS. 23 to 27 show an embodiment of the flexible container used for the freezing apparatus of the present invention.

Figure 23:
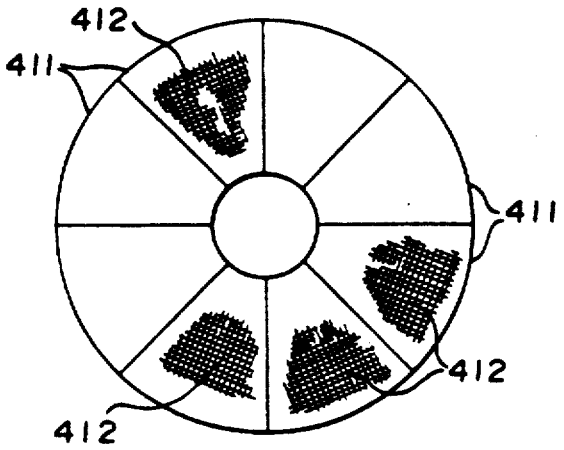
FIG. 23 is a plane view of an embodiment of the lower sheet portion of the flexible container of the present invention.
Figure 24:
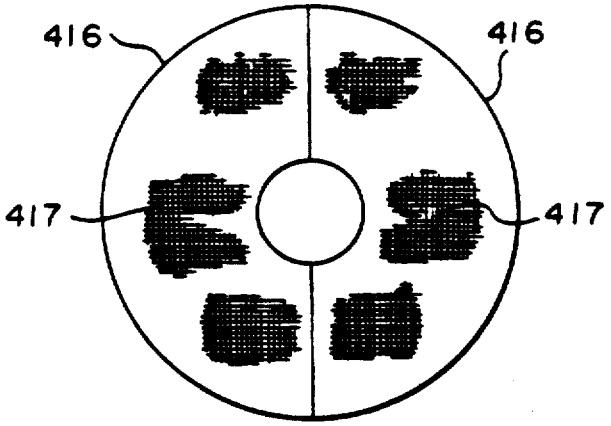
FIG. 24 is a plane view showing the upper sheet portion of the flexible container of the present invention.
Figure 25:
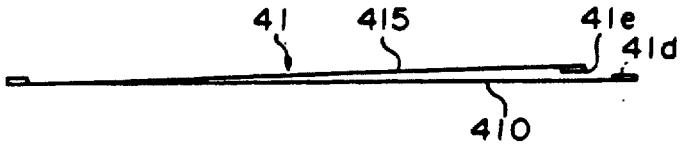
FIG. 25 is a cross-sectional view partly broken of the flexible container of the present invention.
Figure 26:
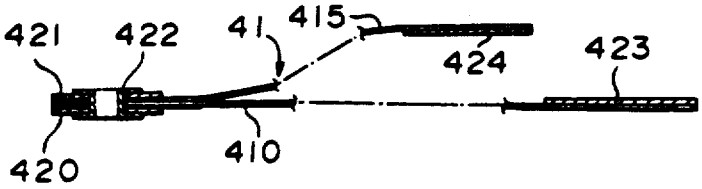
FIG. 26 is a cross-sectional view showing a state that the lower sheet portion is joined to the upper sheet portion in the flexible container according to the present invention.
Figure 27:
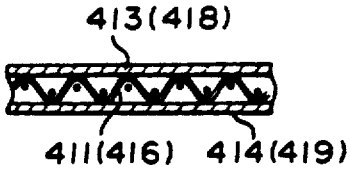
FIG. 27 is a cross-sectional view showing a joint portion as shown in FIG. 26 in detail.
Figure 28:
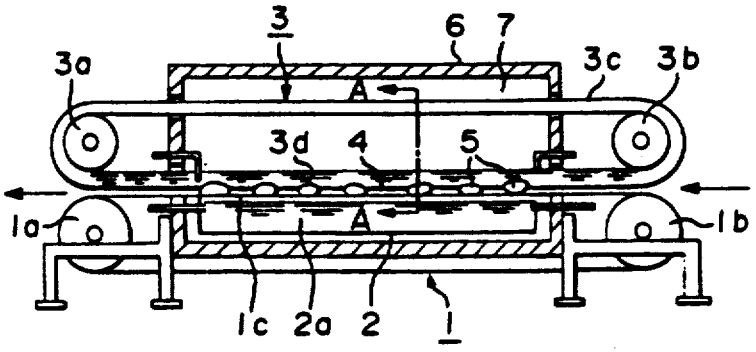
FIG. 28 is a cross-sectional view of a conventional freezing apparatus.
Figure 29:
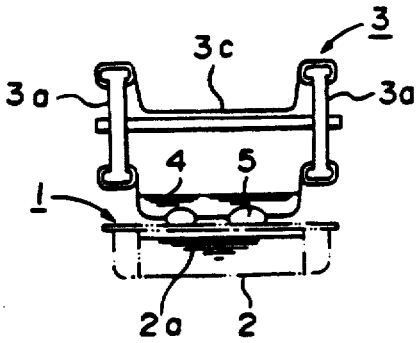
FIG. 29 is a cross-sectional view taken along a line A—A in FIG. 28.

In FIGS. 23 to 27, a reference numeral 410 designates the lower sheet portion of the flexible container 41 to be positioned in contact with the cooling plate 24. The lower sheet portion 10 is formed as follows. A sheet material made of a fabric is cut into plural sheets of cloth 41 having a sectrial shape to be used them as core materials 411 (FIG. 23 and FIG. 27). The plural sheets of the cut cloth 411 are arranged in an annular form so that they have the same network, followed by connecting them by sewing. The annular core material is covered by upper and lower flexible sheet-like materials 413, 414 made of a thin material such as synthetic rubber.

A numeral 415 designates the upper sheet portion of the flexible container 41. The upper sheet portion 415 is prepared as follows. A sheet of cloth is cut into a semi circular-shaped cloth 416 (FIG. 24), and they are connected in one piece so that the network 417 of the two pieces of cloth is in the same direction in the same manner as the lower sheet portion 410. Then, the circular cloth is covered by upper and lower sheet-like elastic materials 418, 419 (FIG. 27). The upper sheet portion 415 may be in one piece as far as the network 417 is as a whole in the same direction.

A numerals 420 designates an outer reinforcing member provided at the lower surface of the outer circumferential portion of the lower sheet portion 410, and a numeral 421 designates an outer reinforcing member provided on the upper surface of the outer circumferential portion of the upper sheet portion 415, a numeral 422 designates a fastening means to fasten the outer circumferential parts of the upper and lower sheet portions 410, 415 through the outer reinforcing members 420, 421, a numeral 423 designates an inner reinforcing member attached to the upper surface of the inner circumferential portion of the lower sheet portion 410, and a numeral 424 designates an inner reinforcing member attached to the lower surface of the inner circumferential portion of the upper sheet portion 415.

Thus, the flexible container 41 is in an annular tube formed by the upper and lower sheet portions 410, 415 in which the upper sheet portion 415 is sealingly connected to the upper sheet-fitting plate and the lower sheet portion 410 is sealingly connected to the lower sheet-fitting plate. The cooling hollow body 22 is connected to the flange 25a of the driving shaft 25 at its inner diameter side, and the lower sheet-fitting plate is connected to the upper end surface of the driving shaft 25.

Thus, in accordance with the present invention, the flexible container is rotated in synchronism with the cooling hollow body due to a frictional force produced between the upper surface of the cooling hollow body and the lower sheet portion of the flexible container and the flexible container can follow the shape of food products, whereby they are entirely covered by the flexible container so that they are sufficiently cooled. Further, there greatly reduces possibility of the damage of the flexible conainer owing to an excessive frictional force applied thereto and occurrence of wrinkles and twisting caused in the flexible container.

We claim:

1. A freezing apparatus which comprises;

a cooling hollow body adapted to receive thereon products to be frozen and adapted to be driven for rotation;

a flexible container made of a flexible sheet material which is arranged on the upper surface of said cooling hollow body so as to cover said products placed on said upper surface;

a cold brine circulating path including the hollow portion of said cooling hollow body and the interior of said flexible container which are mutually communicated to feed cold brine;

an adapter means comprising a plurality of adapters which are attached to the outer periphery of said flexible container; and a guide means provided around the outer periphery of said flexible container to slidably support said adapters, whereby said flexible container is moved synchronously with said cooling hollow body due to a frictional force resulted between said flexible container and said cooling hollow body.

2. The freezing apparatus according to claim 1, wherein said guide means is made of a flexible annular body.

3. The freezing apparatus according to claim 1, wherein an overflow tube is provided to adjust the surface level of the cold brine in said flexible container.

4. The freezing apparatus according to claim 1, wherein said flexible container is an annular tube.

5. The freezing apparatus according to claim 1, wherein said adapters are attached to the outer periphery of the flexible container at equal intervals.

6. The freezing apparatus according to claim 1, wherein said cold brine circulating path includes a heat exchanger.

7. The freezing apparatus according to claim 1, which further comprises a lifting means for lifting a part of said guide means in a curved form.

8. The freezing apparatus according to claim 7, said lifting means is provided at the side of the inlet portion of the apparatus and an open space for putting and removing food products is formed between the upper surface of the cooling hollow body and said flexible container by lifting a part of said flexible container at said inlet portion.

9. The freezing apparatus according to claim 1, wherein each of said adapters has a pair of rotatable rollers which are in contact with and capable of revolving along the both sides of said guide means.

10. The freezing apparatus according to claim 1, which further comprises an integration means which moves the upper part of said flexible container with the lower part in contact with said cooling hollow body.

11. The freezing apparatus according to claim 1, wherein said cold brine circulating path includes a brine returnng path which communicates with said cooling hollow body and flexible container to return the cold brine to a brine tank.

12. The freezing apparatus according to claim 1, wherein a bearing for supporting the shaft of said cooling hollow body is constituted by a plurality of bearing housings each of which is splittable in the axial direction and is detachably connected onto the shaft.

13. The freezing apparatus according to claim 12, wherein said cold brine circulating path comprises a cold brine feeding conduit provided in said shaft of the cooling hollow body so as to communicate the hollow portion of the cooling hollow body with the interior of said flexible container.

14. The freezing apparatus according to claim 1, wherein said cooling hollow body is provided therein with a plurality of flow-regulating plates arranged in the radial direction to form a zig-zag flow path for the cold brine, and said zig-zag flow path is communicated with the interior of said flexible container.

15. The freezing apparatus according to claim 14, wherein at least one cold brine introducing port and cold brine discharging port are respectively formed in the bottom of the hollow portion of the cooling hollow body at its inner diameter side.

16. The freezing apparatus according to claim 15, wherein said cold brine introducing port is formed at a position in alignment with one of said flow-regulating plates whose outer end is connected to the inner wall of the outer circumferential wall and whose other end is free so that the cold brine fed through the cold brine introducing port is divided to flow both sides of said flow-regulating plate.

17. The freezing apparatus according to claim 15, wherein said cold brine introducing port and said cold brine discharging port are formed opposing at both sides of a separating plate in the hollow portion of said cooling hollow body.

18. The freezing apparatus according to claim 14, wherein a by-pass is formed in said flow-regulating plates at a position where the outer end of said flow-regulating plates radially extending is connected to the inner surface of the outer circumferential wall of said cooling hollow body.

19. The freezing apparatus according to claim 1, wherein at least lower sheet portion of said flexible container is constituted by plural sheets of cloth having a sectorial shape which are connected in an annular form so that the network of said connected sheets of cloth is coincidence with each other, and an elastic sheet material covering said connected cloth in one piece.

20. The freezing apparatus according to claim [19] *1*, wherein [the upper sheet portion of] said flexible container [is] *includes an upper sheet portion* constituted by plural sheets of cloth in *at least* a semi-circular form [or a circular form] in which [the network] *networks* of [them is] *threads in all of the plural sheets have* the same *orientation*, and an elastic sheet material covering said sheets of cloth [in one] *to form the upper sheet portion as a single* piece.

* * * * *